May 20, 1958     E. M. WILLIAMS     2,835,784
SPARK MACHINING APPARATUS
Filed July 21, 1954

Inventor
Everard M. Williams
Carlson, Pitzner, Hubbard & Wolfe
Att'ys

United States Patent Office 2,835,784
Patented May 20, 1958

2,835,784

SPARK MACHINING APPARATUS

Everard M. Williams, Pittsburgh, Pa., assignor, by mesne assignments, to Firth Sterling Inc., Pittsburgh, Pa., a corporation of Pennsylvania Application July 21, 1954, Serial No. 444,837

2 Claims. (Cl. 219—69)

This invention relates to apparatus for electrically dislodging particles from a conductive workpiece by a series of over-voltage initiated short time-spaced spark discharges, the art of so removing material being usually termed as "spark cutting" or "spark machining" and sometimes "spark erosion." This application is a continuation in part of my application, Serial No. 204,183, filed January 3, 1951, now abandoned.

Spark cutting has found particular utility for machining extremely hard materials such as tungsten and other carbides, hard steel alloys, and the like. For tungsten carbide particularly, this method has proven many times faster than the conventional machining methods employing diamonds or diamond dust and has made possible many machining operations which could not otherwise be performed. Various other advantages are inherent in this type of machine, one being freedom from heat treatment problems as the workpiece is not materially heated by the spark machining nor is the spark machining effectiveness itself affected by the state of heat treatment of the workpiece. Another is the simplicity and inexpensive construction of the shaping tool, since it serves entirely as a non-contacting electrode, while the sparks do the work of dislodging workpiece particles or chips.

In spark machining apparatus, it is desired to provide very short but high current time spaced sparks across the spark gap defined between a shaped electrode tool and the conductive workpiece. Capacitive energy storage means have been found particularly useful for storing the large amounts of energy required for the discharge impulse. Reference is made to U. S. Patent 2,650,979, issued September 1, 1953, on the application of Edmund E. Teubner and assigned to the assignee of this application for disclosure of a typical prior art apparatus in which the charging voltage on the capacitor connected across the spark gap rises high enough to temporarily ionize the gap and discharge the capacitor, the charging and discharging process repeating itself at a rate subject to the time constant of the charging circuit. One of the problems associated with this and other types of spark machining apparatus, however, has been the erosion of the electrode tool itself. While these electrodes are usually made of a relatively soft and easily machined metal such as brass, it being economically unfeasible to design and make the special electrode tools for the particular machining requirements of very hard metals, the wear on the tool itself or the erosion of the tool introduces problems in maintaining the machining accuracy as well as requiring frequent electrode replacement. The problem is amplified if the electrode tool is shaped to provide specially contoured bores or cuts such as in a spark machining screw threading operation described in the aforesaid Teubner patent.

It is therefore a primary object of the present invention to provide means for reducing the rate of erosion of the electrode tool in spark machining apparatus.

The object of the invention thus generally set forth together with other objects and ancillary advantages are attained by the construction and arrangement shown by way of illustration in the accompanying drawings, in which.

Figure 1:
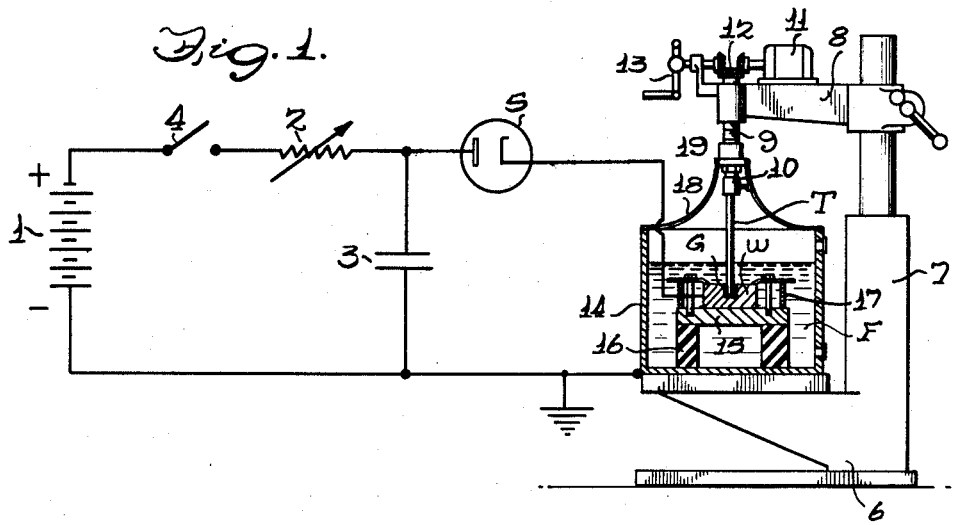
Figure 1 is a diagram of a spark machining circuit embodying my invention together with a view, partly in section, of the spark gap and associated machine tool structure.

While the invention is susceptible of various modifications and alternative constructions, there is shown in the drawings and will herein be described in detail certain preferred embodiments, but it is to be understood that it is thereby intended to cover all modifications, equivalents, and alternative constructions falling within the spirit and scope of the invention as expressed in the appended claims.

A better understanding of the operational requirements of spark machining apparatus generally and of the novel and distinctive manner in which certain of those requirements are met by the improved apparatus incorporating my invention as particularly described hereinafter may be gained by first considering that portion of Fig. 1 illustrating the spark gap itself. This spark gap G is defined by the spacing between the facing portions of a conductive workpiece W and an electrode tool T. While the shapes of materials of the electrodes depend upon the particular machining requirements involved, the workpiece W may suitably be a block of tungsten carbide which is to be provided with either a through or blind bore. The electrode tool T is conveniently made of a soft material such as a brass rod having a cross section substantially complementary to the desired bore cross section. As will become apparent later, the radius of the tool must be less than the required finish radius.

This spark gap G is flooded or inundated during the spark machining operation with a dielectric fluid F, the fluid commonly being a liquid hydrocarbon such as kerosene.

When a sufficiently large positive voltage is applied to the workpiece W so that it acts as an anode with respect to the cathodic tool, disruptive breakdown of the dielectric occurs. The spark discharge across the ionized path is briefly maintained, the dielectric being self-restoring. The voltage required to initiate the discharge increases with increase in the spark gap length, and with kerosene of a given purity or cleanliness the voltage drop required to maintain the ionization during the spark discharge is in the vicinity of 35 volts. Practical spark gap lengths are small, being usually less than a thousandth of an inch with brass cathode tools, and while the discharge peak current may be up to thousands of amperes, the discharge duration is usually at most a few hundred microseconds and preferably very much less. The dielectric helps provide a controlled spark discharge not only readily initiated at relatively low voltages, but also readily deionized and thus terminated. During the brief period when the fluid directly in the spark path is ionized it is believed to be converted to a high pressure gas which represents a substantially unlimited ion supply for high current flow. The fluid also serves non-electrical functions such as conveying the entrained or suspended removed particles from the active spark gap region. As a matter of definition of the kerosene or other fluid selected, it should be understood that the dielectric characteristics are such as to prevent electrolytic conduction of high currents of the order of magnitude required for spark currents and that it has essentially liquid state properties as supplied to the gap.

The dislodging of particles from the conductive workpiece by the spark action, as presently understood by the applicant, is best explained in terms of the electric field force produced by the spark current. Thus with the workpiece at a positive potential with respect to the electrode, the disruptive breakdown of the dielectric between them is the occasion for flow of electronic current to the workpiece. Considering the spark terminus on the surface of the workpiece as an approximate point source of current, the current densities at and just under the surface of the workpiece are very high. Due to the resistivity of the workpiece metal, a substantial electric field gradient along the current path in the workpiece near the surface receiving the spark is produced. This electric field gradient results in a force on the positive ions in the material. These positive ions are the atoms in the crystal lattice of the material less the associated orbital electrons which are free to move and provide the ordinary conduction properties of the material. The electrostatic forces on that volume of workpiece material thus positively charged tend to tear it away from the main body of the workpiece. The rupturing forces must overcome the tensile strength of the workpiece material to dislodge a particle and thus erode or machine the workpiece.

The size of the fragment thus dislodged is limited by the decrease in current density with distance from the point current source on the workpiece surface. Thus, neglecting skin effect, the current density $J_r$ at any distance $r$ from a point current source on the workpiece surface is:

$$J_r = \frac{I}{2r^2}$$

Assuming a given critical current density, $J_c$, is required for removal of a workpiece fragment of given tensile strength material, the radius of which this current density exists will therefore be:

$$r = \frac{I}{2J_c}$$

From this equation the radius, taken from the center of the ionized path, of the crater that occasioned the dislodgment of a workpiece fragment is proportional to the square foot of the spark current.

The field force on the ions in the lattice of the electrode tool cathode is directed into its surface rather than away from it so that the tool is not subjected to the same rupturing forces on the anodic workpiece.

By the same theory the crater depth produced by a spark depends primarily upon the spark current. The time duration of the spark discharge, on the other hand, would seem most effective in increasing the crater area, presumably since the spark terminus on the workpiece may change somewhat due to the changing contour of the workpiece as the spark action proceeds.

Laboratory tests made with carefully controlled, very short discharges of given voltage, yield the following empirical relation which is in accord with the electric field force theory:

$$V = K_v T \cdot I^{3/2}$$

where V is the volume of a particle crater, $K_v$ is a constant including the inverse of the tensile strength of the workpiece, T is the time duration of the current, and I the current. Correspondingly for the depth D of the crater:

$$D = K_d T^{1/3} \cdot I$$

where $K_d$ is a constant corresponding to $K_v$.

Applying these relationships to spark cutting apparatus it is seen that for a given spark duration, the current amplitude determines the amount of material dislodged per spark, and that for a given amount of energy (product of current and duration) effectiveness is increased by increasing the current to time ratio.

The values involved in actual machining practice, as for tungsten carbide, for example, approach those predicted and confirm the analysis. Microscopic examination of the craters left upon particle dislodgment reveals evidence of fracture by mechanical forces. The crater left by a single spark appears to be formed by the progressive removal of several particles or the progressive crumbling of the workpiece material. In accordance with the theory, the softness of a brass cathode electrode compared to a workpiece anode such as tungsten carbide does not affect the spark machining since it depends upon the electrical energy of the spark discharges and no physical contact whatsoever is made by the electrode with the workpiece. The total material removal is, of course, the cumulative effect of a number of discharges and hence the repetition rate is directly involved in actual practice. It may be seen, however, that the electrode tool T is also subject to direct spark machining action should the current flow be reversed so that spark current flows from the workpiece W to the electrode tool. It is important therefore that the tool T should not become positive with respect to the workpiece and that oscillatory currents should be avoided.

Referring again to Fig. 1, one manner in which a spark gap G may be suitably powered is shown. Thus a direct current source 1, indicated conventionally as a battery, is connected through a variable resistor 2 to a capacitor 3. A switch 4 may also be suitably inserted in series with the resistor to initiate operation. This portion of the circuit described may be considered as the charging circuit and has a time constant equal to the product of the resistance times the capacitance. The same capacitor 3 is also connected to the spark gap electrodes to form a discharge circuit, the positive terminal of the capacitor being coupled to the workpiece anode W and the negative electrode to the tool cathode T.

In accordance with my invention, a unidirectional conducting device 5 which may suitably be an electronic rectifier or discharge device diode having a high current rating, is employed in the discharge circuit. The rectifier is connected in circuit to permit the discharge current flow in the normal direction and since it is shown here in the positive line, its anode is connected to the positively charged capacitor terminal and its cathode is connected in circuit to the spark gap to the workpiece W. A machine tool structure or mechanical unit with which the circuit may be employed is also indicated in Fig. 1. This machine, resembling a vertical drill press in many respects, has a base 6 and an upright column 7. An upper arm 8 extending radially from the column supports the vertical spindle 9. A chuck 10 on the lower end of the spindle holds the tubular electrode tool.

The machine is designed to provide vertical feeding or retracting of the tool T under precise control, a suitably controlled electric motor 11 which is mounted on the arm 8 being preferably employed. As shown, the motor rotates a spindle sleeve 12 journaled in the arm 8, the upper portion of the spindle being in threaded engagement with the sleeve so that it is raised or lowered as the spindle rotates. A hand wheel or manual crank 13 is also geared to the spindle sleeve to permit adjustment independently of the motor feed which in actual practice is desirably automatically electronically controlled. Reference is made to my copending application Serial Number 254,566, filed November 2, 1951, in which suitable automatic control systems are disclosed and claimed. The machine may also be designed to provide rotary as well as translational movement to the tool.

Supported from the base 6 below the spindle 9 is a worktank 14 preferably made of a non-magnetic good conductor, such as copper. The workpiece is supported on a conductive work deck 15 spaced from the floor of the tank by insulating blocks 16. The workpiece is suitably held in precise position and also in good conductive contact with the work deck 15 by clamps or dogs 17. Flexible conductors 18 are connected from the tank to a collar 19 on the spindle 9 to provide a conductive path from the worktank to the tool T, the spindle and chuck being conductive. The conductors 18 are provided with sufficient slack to permit raising and lowering of the tool and are preferably respectively connected to the tank at spaced intervals around its upper portion.

The worktank contains the dielectric fluid F, the workpiece being submerged in this arrangement to insure complete flooding of the gap G between the workpiece and the tool, and also conveniently serves as part of the discharge circuit. As shown, the negative conductor is connected to the worktank, the worktank and machine being grounded for operator safety. The connection to the electrode tool T is made through the tank as described to provide a convenient and safe low-inductance path for the high discharge currents. A positive connection to the workpiece W is suitably made by a connection from the cathode of the diode 5, and may be permanently connected to the work deck 15, or clamp 17. Means (not shown) are provided for circulating and filtering the kerosene or other fluid employed to remove the suspended or entrained workpiece particles conveyed from the gap G by the fluid.

In the operation of the circuit of Fig. 1, the capacitor 3 is charged from the source 1, eventually approaching the voltage of the source unless the spark gap G is maintained with a small enough spacing so as to assure spark-over or disruptive breakdown at or below the level of the source voltage. Upon spark-over, the capacitor 3 discharges through the discharge circuit providing its stored energy for maintaining a very short but high current spark as is required for effective machining. After the capacitor has discharged and its voltage has fallen to or near zero, ionization cannot be maintained and the spark current is quenched, providing the spark gap voltages do not reverse due to oscillatory currents. The process then repeats itself in the manner of a relaxation oscillator, a high repetition rate being desired for rapid spark machining. It is desired that the spark impuses be very short and that they should not be prolonged since the spark must not lose its identity as such and degenerate into a heating arc supplied directly from the source 1 with consequent damage to the workpiece as well as ineffective workpiece particle dislodgment. The period between the positive pulses is normally long compared to the duration of the pulse itself and it may be seen that any given spark must be extinguished and the gap deionized before the capacitor 3 may again be charged to the spark-over potential.

Due however to the inherent distributed inductance of the discharge circuit, the discharge current tends to oscillate. While this inductance is desirably as small as possible, the rate of current change upon discharge is very large and the current itself is of such large amplitude so that the momentarily stored inductive energy is by no means negligible.

Were it not for the rectifier 5 of Fig. 1 an oscillatory current would flow across the spark gap between the capacitor 3. This oscillation, although at a very high frequency due to the low inductance value and although it is damped out in a few cycles because of losses in the resistance of the conductors and the gap, is of material consequence in spark machining. One reason is the increased electrode tool wear and another is the delay involved since the charging of the capacitor does not begin until the gap is quiescent or substantially so. The discharge repetition rate and hence the machining speed is thus decreased.

Figure 3:
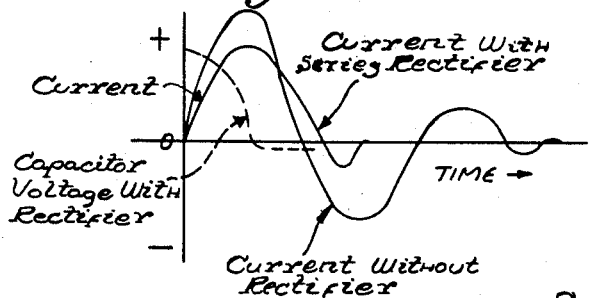
Fig. 3 is a set of curves showing spark discharge current in the apparatus of Fig. 1.

The effect of the series diode 5 is indicated by the curves of Fig. 3. As may be seen, without the diode rectifier in the circuit, the current oscillates for several cycles, the second half cycle or first negative first cycle being especially large in amplitude and deleterious to the electrode tool. The remaining half cycles are principally objectionable in delaying the recharging of the gap. As may be seen, the addition of the rectifier almost entirely eliminates the first negative half cycle and the succeeding oscillatory current. Only a very small portion of the first negative half cycle remains, that portion probably being in part due to the capacitance across the diode electrodes and the distributed inductance in parts of the discharge circuit between the diode and the spark gap. The current during the first half cycle is also somewhat decreased due to the voltage drop across the rectifier during its conduction period. In practice, in a particular circuit it has been found that inclusion of the rectifier as shown resulted in about 50 percent reduction in the electrode tool erosion.

Since a low forward drop in the rectifiers is desirable, one practical and inexpensive expedient for meeting the current carrying requirements of the spark discharge circuit is to employ a number of germanium rectifier units of small size in parallel. In a particular instance with a charging source 1 of 160 volts, a resistor 2 set at 16 ohms, and with capacitor 3 having a 4 microfarad capacity, eight diode sections of four type 1N158 germanium double diodes were connected in parallel as the rectifier 5. Although the normal rated current of each diode section is only .5 ampere, the parallel combination successfully handled without apparent adverse effects on the diodes and a time averaged discharge current of five amperes. In this instance, with the frequency attained in the order of 20,000 kilocycles and the spark discharge of the order of 3 microseconds, the peak spark current, as further determined with the aid of oscilloscope, was in the order of 250 to 300 amperes despite the high repetition rate attained with the aid of the rectifier units, the time between pulses averages 50 microseconds less the 3 microsecond pulse duration so that the duty cycle is light. Larger or smaller spark powering circuits may be similarly designed, as is apparent to those skilled in the art.

Figure 2:
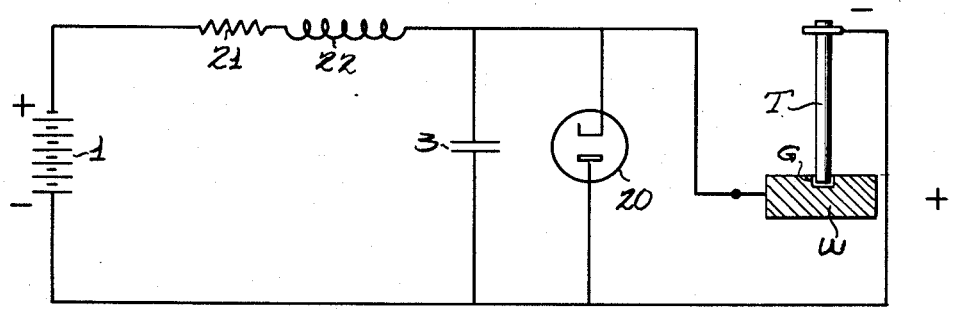
Fig. 2 is a circuit diagram representing a modification of the circuit of Fig. 1.
Figure 4:
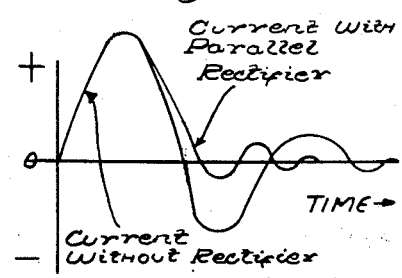
Fig. 4 is a set of curves showing the spark discharge current in the apparatus of Fig. 2.

A modified circuit is illustrated in Fig. 2 in which, according to my invention, a unidirectional conducting device 20 is connected in the discharge circuit of the capacitor 3 but across the spark gap 6; that is, in parallel with the capacitor 3. It is important that the diode have its cathode connected to the positive line and its anode to the negative line so that it does not conduct the normal discharge current. By way of illustrating circuits in which my invention is suitably incorporated, the charging network in this case is indicated as a resistor 21 and choke coil or inductor 22, the inductive reactance of the choke providing faster charging as explained in the co-pending application by Edmund E. Teubner, Serial Number 202,-361, filed December 22, 1950, which matured to Patent No. 2,756,316 on July 24, 1956, and assigned to the assignee of the present invention where apparatus incorporating inductive charging circuits are disclosed and claimed Referring now to Fig. 4, it may be seen that the effect of the parallel diode 20 is much the same as that of the series diode 5 and is indicated in the curves of Fig. 2. While the positive discharge current itself does not pass through the parallel diode 20 because the diode is connected for conduction in the reverse direction, the reverse oscillatory currents are effectively by-passed through the diode, a large portion of the oscillatory energy being dissipated in the diode circuit. It will be appreciated that during the reverse half cycles, the electrode tool T momentarily becomes the anode and the workpiece W the cathode, so that the diode is correctly polarized to conduct this current and effectively short circuit it. The initial current amplitude is not attenuated as no forward current flows through the diode. More or less of the oscillatory energy is dissipated, the damping increasing with decrease in the resistance of the diode while conducting. As shown, the oscillations tend to persist for a longer number of half cycles than in the circuit of Figure 1 but with the advantage of less attenuation of the first half-cycle or positive pulse. As with the series diode of Fig. 1, the parallel diode of Fig. 2 becomes more effective in approaching the ideal condition where the current remains at zero upon completion of the first positive pulse with decrease in conductivity of the diode.

It will be understood that while the unidirectional device 5 of Fig. 1 or 20 of Fig. 2 is shown as an electronic diode rectifier, the unidirectional device is not limited to any one type. The size of the device may be increased to increase its power handling capability and a number of devices may be employed in parallel. The device may be understood to be suitably either a "hard" vacuum tube or a "soft" tube containing ionizable gas or vapor. This vapor may be provided for example by mercury, the rectifier being suitably of the mercury pool type or an ignitron type of device. No attempt has been made to illustrate the conventional filament, heater or starter circuits, as such are very well understood in the art.

I claim as my invention:

1. An apparatus for electrically spark machining a conductive workpiece with an electrode tool comprising means for supporting a tool with respect to a workpiece to define a spark gap therewith, means for inundating the spark gap thus defined with dielectric fluid, a spark-powering capacitor, means for connecting the capacitor to a source of direct current voltage, said source voltage having a sufficiently high level to cause over-voltage breakdown of the dielectric liquid in the spark gap, and circuit means connecting said gap across the capacitor in polarity to provide a positive spark current discharge flow from the workpiece to the tool when the capacitor has been charged to a voltage sufficient to cause said over-voltage breakdown of the dielectric liquid, said circuit means including a rectifier diode in series with said gap polarized to permit said positive current flow and to block oscillatory reverse currents.

2. An apparatus for electrically spark machining a conductive workpiece with an electrode tool comprising means for supporting a tool with respect to a workpiece to define a spark gap therewith, means for inundating the spark gap thus defined with dielectric fluid, a spark-powering capacitor, means for connecting the capacitor through a current-limiting charging impedance to a source of direct current voltage, said source voltage having a sufficiently high level to cause over-voltage breakdown of the dielectric liquid in the spark gap, and circuit means connecting said gap across the capacitor in polarity to provide a positive spark current discharge flow from the workpiece to the tool when the capacitor has been charged to a voltage sufficient to cause said over-voltage breakdown of the dielectric liquid, said circuit means including a rectifier diode in series with said gap polarized to permit said positive current flow and to block oscillatory reverse currents.

References Cited in the file of this patent

UNITED STATES PATENTS

| | | |
|---|---|---|
| 2,235,385 | Rava | Mar. 18, 1941 |
| 2,287,543 | Vang | June 23, 1942 |
| 2,310,092 | Knowles et al. | Feb. 2, 1943 |
| 2,501,954 | McKechnie | Mar. 28, 1950 |
| 2,552,582 | Peters et al. | May 15, 1951 |
| 2,628,330 | Williams | Feb. 10, 1953 |
| 2,697,160 | Williams | Dec. 14, 1954 |

FOREIGN PATENTS

| | | |
|---|---|---|
| 257,468 | Switzerland | Apr. 1, 1949 |